United States Patent
Yoshida et al.

(10) Patent No.: US 9,368,850 B2
(45) Date of Patent: Jun. 14, 2016

(54) FUEL CELL SYSTEM AND FUEL CELL VEHICLE

(75) Inventors: Michio Yoshida, Nishikamo-gun (JP); Tomoya Ogawa, Toyota (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 1013 days.

(21) Appl. No.: 12/810,471

(22) PCT Filed: Dec. 11, 2008

(86) PCT No.: PCT/JP2008/072553
§ 371 (c)(1),
(2), (4) Date: Jun. 24, 2010

(87) PCT Pub. No.: WO2009/081753
PCT Pub. Date: Jul. 2, 2009

(65) Prior Publication Data
US 2010/0279187 A1 Nov. 4, 2010

(30) Foreign Application Priority Data
Dec. 26, 2007 (JP) .................... 2007-334356

(51) Int. Cl.
H01M 16/00 (2006.01)
B60L 11/18 (2006.01)
H01M 8/04 (2016.01)

(52) U.S. Cl.
CPC ......... *H01M 16/006* (2013.01); *B60L 11/1887* (2013.01); *B60L 11/1894* (2013.01);
(Continued)

(58) Field of Classification Search
None
See application file for complete search history.

(56) References Cited

U.S. PATENT DOCUMENTS 6,232,729 B1 5/2001 Inoue
2002/0047429 A1* 4/2002 Kadoya et al. ........... 310/156.39
(Continued)

FOREIGN PATENT DOCUMENTS

CN 1325172 A 12/2001
CN 1325182 A 12/2001
(Continued)

OTHER PUBLICATIONS

Chinese Office Action dated Nov. 5, 2012 issued for Chinese Application No. 20080122768.9.

*Primary Examiner* — Patrick Ryan
*Assistant Examiner* — Wyatt McConnell
(74) *Attorney, Agent, or Firm* — Kenyon & Kenyon LLP

(57) ABSTRACT

There is disclosed a fuel cell system having a motor which can be driven and generate a regenerative power by receiving the supply of a power, wherein an influence on power supply control is decreased. The fuel cell system fuel cell system comprises a fuel cell which generates a power by an electrochemical reaction of a fuel gas and an oxidant gas; a motor which can be driven and generate the regenerative power by receiving the supply of a power; an inverter which converts a direct-current power output from the fuel cell into an alternate-current power to supply the power to the motor, thereby controlling the driving of the motor; a battery which is connected to the motor in parallel with the fuel cell, and which can be charged with the power generated by the fuel cell and the regenerative power generated by the motor and which can discharge the charged powers to the motor; a rotation number detector which detects the rotation number of the motor; and a control unit which determines whether or not to allow the stop of the control by the inverter with respect to the motor based on the present rotation number of the motor. The control unit compares the present rotation number of the motor with a threshold value which varies in accordance with operation modes of the fuel cell, to perform the determination.

6 Claims, 3 Drawing Sheets

(52) U.S. Cl.
CPC .......... *H01M8/0488* (2013.01); *H01M 8/0491* (2013.01); *H01M 8/04365* (2013.01); *H01M 8/04559* (2013.01); *H01M 8/04589* (2013.01); *H01M 8/04604* (2013.01); *H01M 8/04619* (2013.01); *H01M 8/04753* (2013.01); *B60L 2240/421* (2013.01); *B60W 2510/081* (2013.01); *Y02E 60/50* (2013.01); *Y02T 10/642* (2013.01); *Y02T 90/34* (2013.01)

(56) References Cited

U.S. PATENT DOCUMENTS

| | | |
|---|---|---|
| 2003/0081440 A1 | 5/2003 | Komatsu et al. |
| 2006/0093880 A1* | 5/2006 | Igarashi et al. .................. 429/22 |
| 2007/0158121 A1 | 7/2007 | Sato |
| 2007/0207356 A1* | 9/2007 | Miyata et al. .................... 429/26 |

FOREIGN PATENT DOCUMENTS

| | | |
|---|---|---|
| DE | 601 30 600 T2 | 2/2008 |
| JP | 9-23508 A | 1/1997 |
| JP | 2001-339923 A | 12/2001 |
| JP | 2006-331775 A | 12/2006 |
| JP | 2007-165104 A | 6/2007 |
| JP | 2007-234554 A | 9/2007 |
| JP | 2007-236197 A | 9/2007 |

* cited by examiner

FUEL CELL SYSTEM AND FUEL CELL VEHICLE

This is a 371 national phase application of PCT/JP2008/072553 filed 11 Dec. 2008, which claims priority to Japanese Patent Application No. 2007-334356 filed 26 Dec. 2007, the contents of which are incorporated herein by reference.

TECHNICAL FIELD

The present invention relates to a fuel cell system and a fuel cell vehicle comprising this system. More particularly, it relates to control by an inverter with respect to a motor which can be driven and generate a regenerative power by receiving the supply of a power in a fuel cell system.

BACKGROUND ART

In recent years, much attention has been paid to a fuel cell system in which a fuel cell for generating a power by an electrochemical reaction of a fuel gas and an oxidant gas is used as an energy source. The fuel cell system supplies the fuel gas having a high pressure from a fuel tank to an anode of the fuel cell, and pressurizes and supplies air as the oxidant gas to a cathode thereof, to cause the electrochemical reaction of the fuel gas and the oxidant gas, thereby generating an electromotive force. The development of a vehicle in which such a fuel cell system is mounted has also proceeded. The fuel cell system to be mounted in the vehicle is constituted mainly of the fuel cell, a secondary battery, a running motor and auxiliary machines.

Meanwhile, in a usual electric vehicle, when a shift position is in a "drive (D)" range, a power is supplied from a battery to a running motor via an inverter or the like to rotate the motor, and the driving force of the motor is transmitted to a driving wheel. On the other hand, in a case where the shift position enters a "neutral (N)" range, the control by the inverter is stopped, and hence the running motor is left to idle, and brought into such a state as to generate a back electromotive voltage corresponding to a rotation number (referred to as the shutdown). That is, the running motor is rotated by the driving force conversely transmitted from the driving wheel, whereby the battery is charged with the generated back electromotive voltage via the inverter.

However, when the rotation number of the motor is large and the shift position enters the "N" range, an excessively large back electromotive voltage is generated, and an overvoltage is applied to the battery and a converter, which might deteriorate durability. To solve the problem in the conventional technology, control is executed so that when the shift position enters the "N" range and the rotation number of the motor is a predetermined threshold value or less, the shutdown is performed and so that when the rotation number is larger than the threshold value, the shutdown is not performed.

As a concerned technology, Patent Document 1 discloses a technology in which when the "N" position is selected, the excessively large back electromotive voltage is prevented from being generated. Moreover, to avoid a feel of difference due to the generation of a regenerative braking force, in the "N" position, target power calculation means uniformly sets a target voltage to zero, thereby preventing a driving torque or a regenerative torque from being generated by the motor.

[Patent Document 1] Japanese Patent Application Laid-Open No. 9-23508

DISCLOSURE OF THE INVENTION

Problem to be Solved by the Invention

In an electric vehicle in which a fuel cell system is mounted, there are various power generation states (operation modes) such as high potential avoiding control for inhibiting the total voltage of a fuel cell from being set to a predetermined threshold value or more and a warm-up operation for raising the temperature of the fuel cell for a short time as compared with a usual operation. Therefore, if it is uniformly controlled in accordance with the rotation number of a motor whether or not to allow shutdown in the same manner as in a usual electric vehicle, a back electromotive voltage becomes larger than the maximum output voltage of the fuel cell depending on the power generation state of the fuel cell, and in this or another way, the power supply control of the whole system might be influenced.

To solve the problem, an object of the present invention is to decrease an influence on power supply control in a fuel cell system having a motor which can be driven and generate a regenerative power by receiving the supply of a power.

Means for Solving the Problem

According to one aspect of the present invention, there is provided a fuel cell system comprising: a fuel cell which generates a power by an electrochemical reaction of a fuel gas and an oxidant gas; a motor which is configured to be driven and to generate a regenerative power by receiving the supply of a power; an inverter which converts a direct-current power output from the fuel cell into an alternate-current power to supply the power to the motor, thereby controlling the driving of the motor; an power storage connected to the motor in parallel with the fuel cell, and configured to be charged with the power generated by the fuel cell and the regenerative power generated by the motor and configured to discharge the charged powers to the motor; a rotation number detector which detects the rotation number of the motor; and a controller which determines whether or not to allow the stop of the control by the inverter with respect to the motor based on the present rotation number of the motor, wherein the controller compares the present rotation number of the motor with a rotation number threshold value which varies in accordance with operation modes of the fuel cell, to perform the determination.

According to the aspect of the present invention, it is determined whether or not to allow the stop (the shutdown) of the control by the inverter with respect to the motor by use of the rotation number threshold value which varies in accordance with the operation modes of the fuel cell, whereby the generation of a back electromotive voltage in excess of the maximum output voltage of the fuel cell is suppressed.

Here, when the present rotation number of the motor is smaller than the rotation number threshold value corresponding to the present operation mode of the fuel cell, the controller allows the stop of the control by the inverter with respect to the motor.

The controller has an internal memory in which the rotation numbers of the motor corresponding to the maximum output voltages of the fuel cell in the operation modes thereof are stored as the rotation number threshold values in association with the operation modes, and the controller extracts one rotation number threshold value corresponding to the present operation mode of the fuel cell from the plurality of rotation number threshold values to perform the determination by use of the rotation number threshold value.

In this way, the rotation number threshold values set for the operation modes are beforehand prepared, whereby the determination can be performed based on the rotation number which can easily be measured and which has less error.

The plurality of operation modes include a usual operation mode and at least one of a high potential avoiding control mode and a warm-up operation mode. The high potential avoiding control mode and warm-up operation mode have a low maximum output voltage as compared with the usual operation mode, and hence the rotation number threshold values corresponding to these operation modes are prepared, whereby the power supply control in the fuel cell system can more safely be performed.

Moreover, a fuel cell vehicle according to the present invention comprises: the above fuel cell system; and an auxiliary machine used for the operation of at least the fuel cell.

Effect of the Invention

According to the present invention, the generation of a back electromotive voltage in excess of the maximum output voltage of the fuel cell or overcharge into the power storage can be suppressed, whereby the influence on the power supply control in the fuel cell system can be decreased. Therefore, an electric vehicle in which such a fuel cell system is mounted can run under stable power supply control.

DESCRIPTION OF REFERENCE NUMERALS

10 . . . control unit (controller), 11 . . . internal memory, 20 . . . battery (power storage), 40 . . . fuel cell, 50 . . . auxiliary machines (auxiliary machine), 60 . . . inverter, 61 . . . traction motor (motor), and 64 . . . rotation number detector.

BEST MODE FOR CARRYING OUT THE INVENTION

Hereinafter, an embodiment according to the present invention will be described with reference to the drawings.

Figure 1:
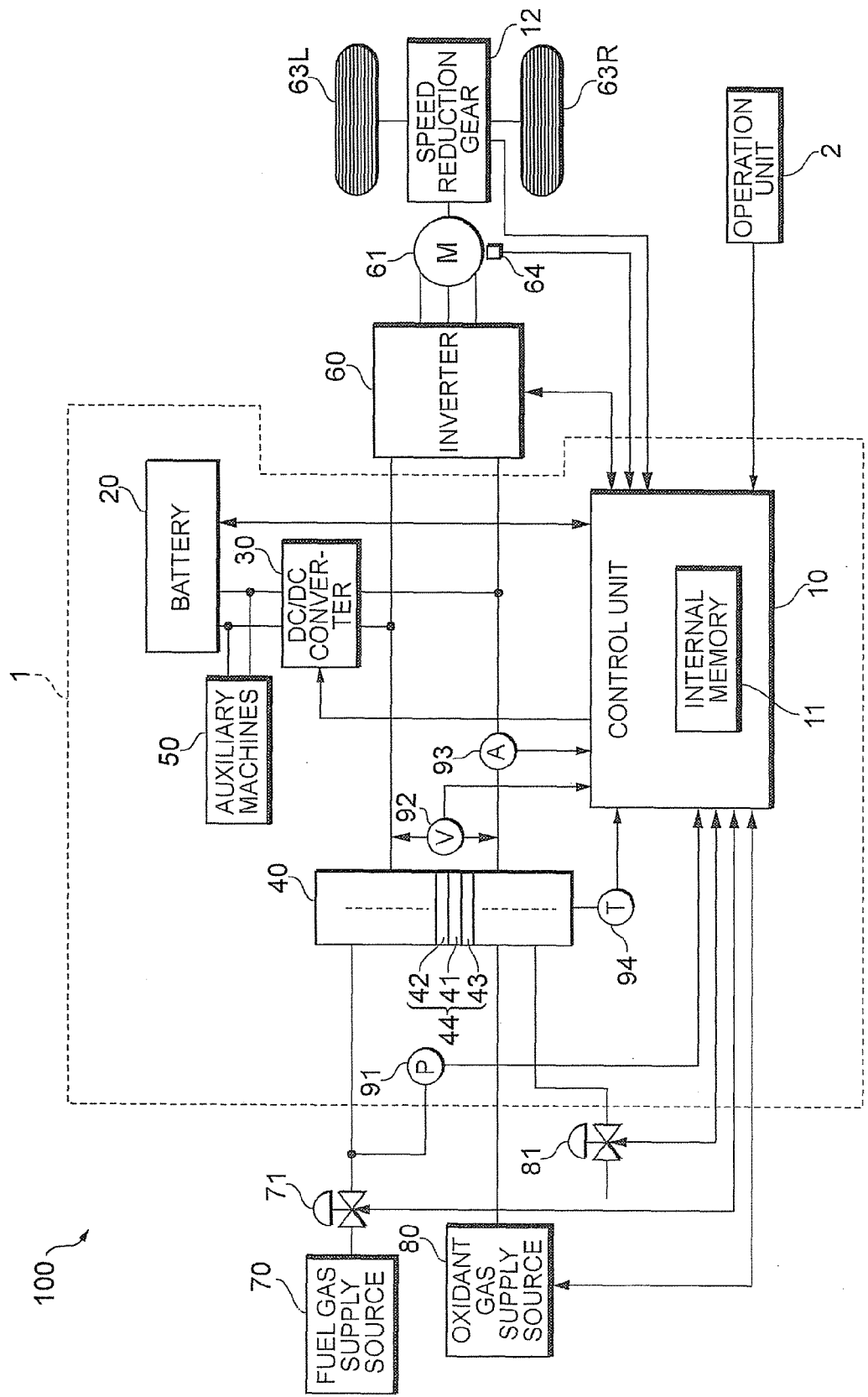
FIG. 1 is a system constitution diagram showing a constitution of a main part of a fuel cell vehicle including a fuel cell system according to one embodiment of the present invention.

FIG. 1 is a diagram showing a constitution of a main part of a fuel cell vehicle comprising a fuel cell system according to one embodiment of the present invention. In the present embodiment, there is assumed a fuel cell system mounted in a vehicle such as a fuel cell hybrid vehicle (FCHV), an electric vehicle or a hybrid vehicle, but the present invention can be applied to not only the vehicle but also various mobile apparatuses (e.g., a two-wheeled vehicle, a ship, an airplane, a robot, etc.).

A vehicle 100 runs by using, as a driving force source, a traction motor (hereinafter referred to simply as the motor) 61 connected to wheels 63L, 63R via a reduction gear 12. A power source of the traction motor 61 is a power source system 1. A direct current output from the power source system 1 is converted into a three-phase alternate current by an inverter 60, and supplied to the traction motor 61. The traction motor 61 can function as a power generator during braking. The power source system 1 is constituted of a fuel cell 40, a battery (an power storage) 20, a DC/DC converter 30 and the like.

The fuel cell 40 is means for generating a power from a supplied reactant gas (a fuel gas and an oxidant gas), and fuel cells of various types such as a solid polymer type, a phosphoric type and a molten carbonate type may be used. The fuel cell 40 comprises a polymer electrolyte membrane 41 constituted of a proton conductive ion exchange membrane made of a fluorocarbon resin or the like, and the surface of the polymer electrolyte membrane 41 is coated with a platinum catalyst (an electrode catalyst).

It is to be noted that the catalyst which coats the polymer electrolyte membrane 41 is not limited to the platinum catalyst, and the present invention can be applied to a platinum cobalt catalyst (hereinafter referred to simply as the catalyst). Each cell constituting the fuel cell 40 comprises a membrane electrode assembly 44 in which an anode electrode 42 and a cathode electrode 43 are formed on both surfaces of the polymer electrolyte membrane 41 by screen printing or the like. The fuel cell 40 has a stack structure in which a plurality of unit cells are stacked in series.

A fuel gas such as a hydrogen gas is supplied from a fuel gas supply source 70 to a fuel electrode (an anode) of the fuel cell 40, whereas an oxidant gas such as air is supplied from an oxidant gas supply source 80 to an oxygen electrode (a cathode).

The fuel gas supply source 70 is constituted of, for example, a hydrogen tank, various valves and the like, and a valve open degree, ON/OFF time and the like are regulated to control the amount of the fuel gas to be supplied to the fuel cell 40.

The oxidant gas supply source 80 is constituted of, for example, an air compressor, a motor which drives the air compressor, an inverter and the like, and the rotation number of the motor and the like are regulated to control the amount of the oxidant gas to be supplied to the fuel cell 40.

An output voltage (hereinafter referred to as the FC voltage) and an output current (hereinafter referred to as the FC current) of the fuel cell 40 are detected by a voltage sensor 92 and a current sensor 93, respectively. Moreover, an internal temperature (hereinafter referred to as the FC temperature) of the fuel cell 40 is detected by a temperature sensor 94.

The battery 20 is a chargeable/dischargeable secondary battery, and is constituted of, for example, a nickel hydrogen battery or the like. Needless to say, any type of chargeable/dischargeable power storage (e.g., a capacitor) other than the secondary battery may be provided instead of the battery 20. The battery 20 is interposed in a discharge path of the fuel cell 40, and is connected in parallel with the fuel cell 40. The battery 20 and the fuel cell 40 are connected in parallel with the inverter 60 for the traction motor, and the DC/DC converter 30 is provided between the battery 20 and the inverter 60.

The inverter 60 is, for example, a PWM inverter of a pulse width modulation system constituted of a plurality of switching elements, and converts a direct-current power output from the fuel cell 40 or the battery 20 into a three-phase alternate-current power in response to a control instruction given from a control unit 10, to supply the power to the traction motor 61. The traction motor 61 is a motor for driving the wheels 63L, 63R, and the rotation number of the motor 61 is controlled by the inverter 60. Moreover, the rotation number of the motor 61 is detected by a rotation number detector 64, and transmitted to the control unit 10.

The DC/DC converter 30 is, for example, a full bridge converter constituted of four power transistors and a drive circuit for exclusive use (they are not shown). The DC/DC converter 30 has a function of raising or lowering a DC voltage input from the battery 20 to output the voltage to a fuel cell 40 side and a function of raising or lowering a DC voltage input from the fuel cell 40 or the like to output the voltage to a battery 20 side. Moreover, the functions of the DC/DC converter 30 realize the charging/discharging of the battery 20.

Between the battery 20 and the DC/DC converter 30, auxiliary machines 50 such as vehicle auxiliary machines and FC auxiliary machines are interposed. The battery 20 functions as a power source for the auxiliary machines 50. It is to be noted that the vehicle auxiliary machines are various power devices (a lighting equipment, an air conditioning device, a hydraulic pump, etc.) used during the operation of the vehicle or the like, and the FC auxiliary machines are various power devices (an air compressor and a pump used for the supply of the fuel gas or the oxidant gas, etc.) used during the operation of the fuel cell 40.

The operations of the above elements are controlled by the control unit (the controller) 10. The control unit 10 has a constitution of a microcomputer comprising therein a CPU, an ROM and an RAM.

The control unit 10 controls, based on input sensor signals, system parts such as a pressure regulator 71 provided in a fuel gas passage, a pressure regulator 81 provided in an oxidant gas passage, the fuel gas supply source 70, the oxidant gas supply source 80, the battery 20, the DC/DC converter 30 and the inverter 60. To the control unit 10, there are input signals indicating, for example, the supply pressure of the fuel gas detected by a pressure sensor 91, the FC voltage of the fuel cell 40 detected by the voltage sensor 92, the FC current of the fuel cell 40 detected by the current sensor 93, the FC temperature detected by the temperature sensor 94, the rotation number of the motor 61 detected by the rotation number detector 64 and the like.

Moreover, the control unit 10 is connected to an operation unit 2 operated by a user to select a vehicle shift position (e.g., P: a parking mode, R: a reverse mode, N: a neutral mode, D: a drive mode or the like). When the shift position is changed, a shift position detecting signal is transmitted from the operation unit 2 to the control unit 10.

Furthermore, when the shift position enters an "N" range, the control unit 10 determines whether or not to stop the driving of the traction motor 61 by the inverter, that is, whether or not to allow shutdown (shutdown control). In this case, the control unit 10 performs this determination by use of the threshold value of the rotation number which varies in accordance with the operation mode of the fuel cell 40, based on the rotation number of the motor 61 at this time.

Figure 2:
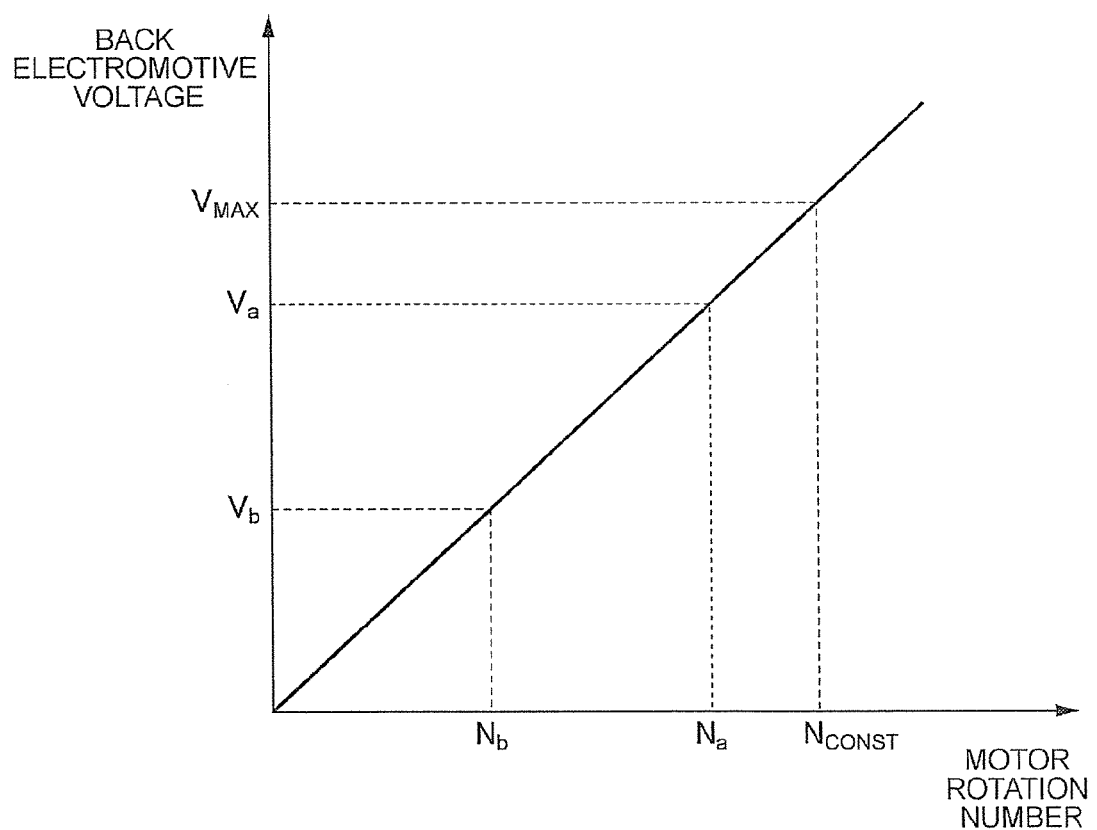
FIG. 2 is a diagram for explaining a method for setting a rotation number threshold value corresponding to an operation mode.

Next, the threshold value of the rotation number used in the shutdown control will be described with reference to FIG. 2.

The operation modes of the fuel cell 40 include, in addition to a normal operation mode, a high potential avoiding control mode or a warm-up operation mode in which the upper limit of the output voltage is set to a value smaller than a usual value and the like.

In the usual operation mode, a maximum value VMAX of an inverter voltage (e.g., an open end voltage of a fuel cell stack) is an allowed upper limit of a back electromotive voltage. Therefore, an upper limit rotation number NCONST corresponding to the upper limit voltage VMAX is set as the rotation number threshold value.

The high potential avoiding control mode is the operation mode in which the output voltage of the fuel cell 40 is forcibly decreased to a predetermined voltage threshold value (a high potential avoiding voltage threshold value) or less in order to suppress the proceeding of the deterioration of the fuel cell. The high potential avoiding voltage threshold value is a voltage lower than the open voltage of the fuel cell 40, and the value is beforehand obtained by an experiment or the like and stored in an internal memory 11 of the control unit 10 during product shipping or the like. Moreover, changeover to the high potential avoiding control mode is controlled based on, for example, the FC voltage or the FC current. Specifically, when the FC voltage and the FC voltage are included in a predetermined region of a characteristic map beforehand prepared, the control unit 10 transmits a control signal to each part so as to enter the high potential avoiding control mode.

In such a high potential avoiding control mode, a maximum output voltage Va of the fuel cell 40 in the high potential avoiding control mode, that is, the high potential avoiding voltage threshold value is the allowed upper limit of the back electromotive voltage. Therefore, an upper limit rotation number Na corresponding to the maximum output voltage Va is set as a threshold value.

On the other hand, the warm-up operation mode is the operation mode in which during low temperature start, self heat generation accompanying the power generation of the fuel cell 40 is promoted (i.e., a heat value is increased) to raise the temperature of the fuel cell 40 for a short time as compared with the usual operation. The warm-up operation is realized by, for example, a low efficiency operation in which the reactant gas (the oxidant gas or the fuel gas) is set to a shortage side as compared with the usual operation and a power loss is increased, that is, the power generation efficiency of the fuel cell 40 is lowered to increase the heat value, or an operation in which the output current of the fuel cell 40 is increased, thereby increasing the heat value generated by the power generation. Moreover, changeover to the warm-up operation mode is controlled based on, for example, the FC temperature. Specifically, when the FC temperature is lower than a predetermined temperature threshold value, the control unit 10 transmits the control signal to each part so as to enter the warm-up operation mode.

In such a warm-up operation mode, a maximum output voltage Vb during the warm-up operation is the allowed upper limit of the back electromotive voltage. Therefore, an upper limit rotation number Nb corresponding to the maximum output voltage Vb is set as a threshold value.

The upper limit rotation numbers NMAX, Na and Nb are associated with the operation modes, respectively, and stored in the internal memory 11 of the control unit 10.

Figure 3:
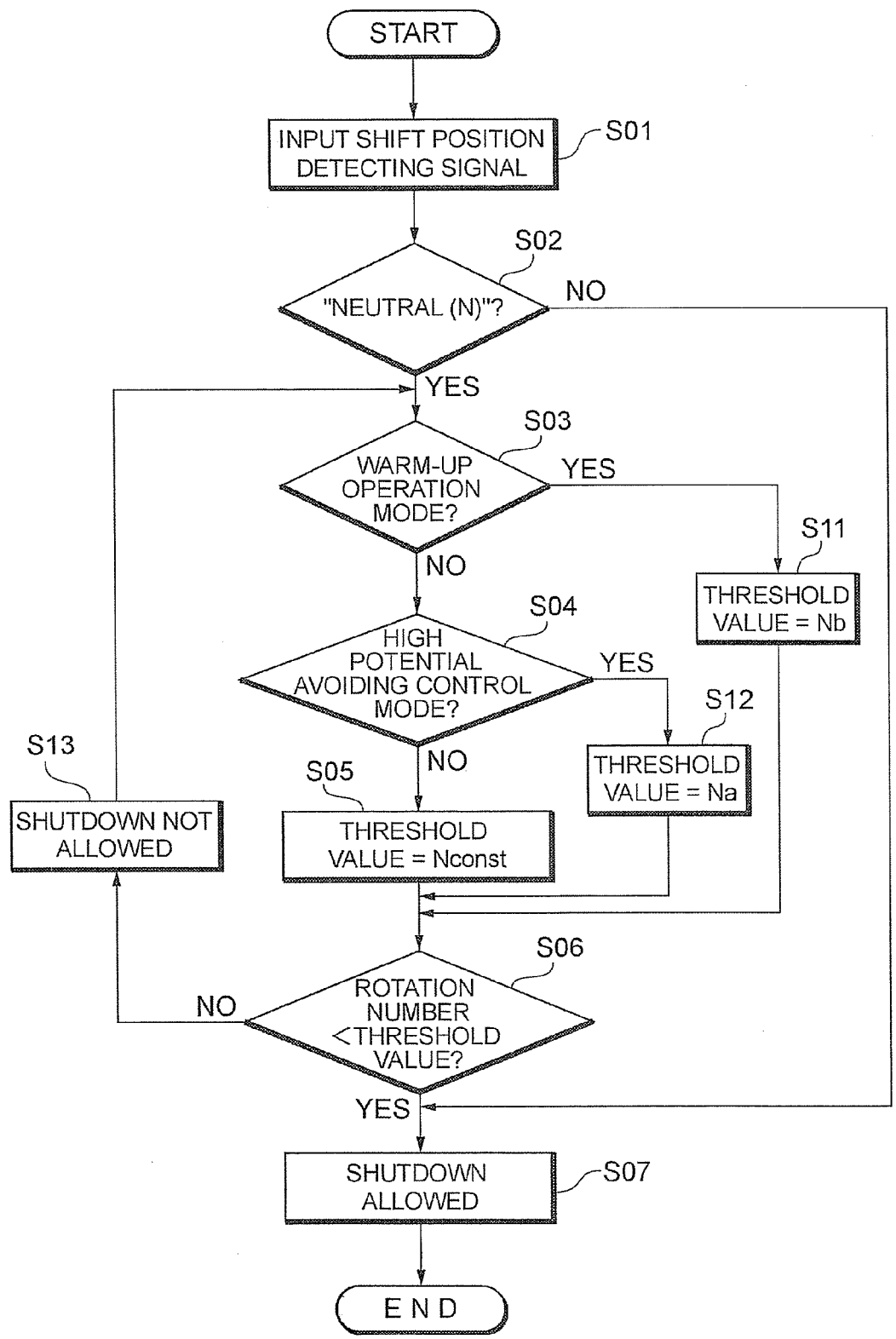
FIG. 3 is a flow chart showing a method for controlling shutdown by a control unit.

Next, a shutdown control operation of the control unit 10 will be described with reference to FIG. 3.

When the shift position detecting signal is input from the operation unit 2 to the control unit 10 in step S01, the control unit 10 judges whether or not this signal indicates the "neutral (N)" range (step S02).

When the shift position detecting signal indicates the "N" range, in step S03, the control unit 10 judges whether or not the present operation mode of the fuel cell 40 is the warm-up operation mode.

When the fuel cell 40 has the warm-up operation mode, in step S11, the control unit 10 sets the upper limit rotation number Nb in the warm-up operation mode to a rotation number threshold value.

On the other hand, when the fuel cell 40 does not have the warm-up operation mode, in step S04, the control unit 10 judges whether or not the operation mode of the fuel cell 40 is the high potential avoiding mode.

When the fuel cell 40 has the high potential avoiding control mode, in step S12, the control unit 10 sets the upper limit rotation number Na in the high potential avoiding control mode to the rotation number threshold value.

When the fuel cell 40 does not have the warm-up operation mode or the high potential avoiding control mode, in step S05, the control unit 10 sets the upper limit rotation number NCONST in the usual operation mode to the rotation number threshold value.

In step S06, the control unit 10 compares the present rotation number of the motor 61 with the rotation number threshold value set in one of the steps S11, S12 and S05. Then, in a case where the present rotation number is smaller than the rotation number threshold value, shutdown is allowed (step S07). In consequence, the control of the motor 61 by the inverter stops.

On the other hand, when the present rotation number is the rotation number threshold value or more, the shutdown is not allowed (step S13). In consequence, the generation of the back electromotive force in excess of the maximum output voltage (VMAX, Vb or Va) in each operation mode is prevented. In this case, when the operation mode of the fuel cell 40 is switched or the rotation number of the motor 61 becomes smaller than the threshold value owing to a brake operation or natural deceleration, the shutdown is allowed.

As described above, according to the present embodiment, it is possible to prevent the generation of the back voltage which is not less than the maximum output voltage (VMAX, Va or Vb) in each operation mode of the fuel cell. Therefore, overvoltage can be inhibited from being applied to the battery or the converter.

It is to be noted that the present embodiment has a constitution in which, as shown in FIG. 1, the auxiliary machines are connected to the DC/DC converter on a battery side, but the present invention may be applied to a constitution in which the auxiliary machines are connected to the DC/DC converter on a fuel cell side. In this case, the rated voltage of the auxiliary machine inverter can be inhibited from being exceeded owing to an excessively large back electromotive voltage.

The invention claimed is:

1. A fuel cell system comprising:
    a fuel cell which generates a power by an electrochemical reaction of a fuel gas and an oxidant gas;
    a motor which is configured to be driven and to generate a regenerative power by receiving the supply of a power;
    an inverter which converts a direct-current power output from the fuel cell into an alternate-current power to supply the power to the motor, thereby controlling the driving of the motor;
    a power storage connected to the motor in parallel with the fuel cell, and configured to be charged with the power generated by the fuel cell and the regenerative power generated by the motor and configured to discharge the charged powers to the motor;
    a rotation number detector which detects the rotation number of the motor; and
    a controller which determines whether or not to allow the stop of the control by the inverter with respect to the motor based on the present rotation number of the motor,
    wherein the controller compares the present rotation number of the motor with a threshold value which varies in accordance with operation modes of the fuel cell, to perform the determination,
    the operation modes include a usual operation mode associated with a rotation number threshold value $N_{CONST}$ and at least one of (a) a high potential avoiding control mode associated with a rotation number threshold value Na that is less than $N_{CONST}$ and (b) a warm-up operation mode associated with a rotation number threshold value Nb that is less than $N_{CONST}$, and
    when the present rotation number of the motor is smaller than the rotation number threshold value corresponding to the present operation mode of the fuel cell, the controller allows the stop of the control by the inverter with respect to the motor.

2. The fuel cell system according to claim 1, wherein the controller has an internal memory in which the rotation numbers of the motor corresponding to the maximum output voltages of the fuel cell in the operation modes thereof are stored as the rotation number threshold values in association with the operation modes, and
    the controller extracts one rotation number threshold value corresponding to the present operation mode of the fuel cell from the plurality of rotation number threshold values to perform the determination by use of the rotation number threshold value.

3. A fuel cell vehicle comprising:
    the fuel cell system according to claim 1; and
    an auxiliary machine used for the operation of at least the fuel cell.

4. A fuel cell vehicle comprising:
    the fuel cell system according to claim 2; and
    an auxiliary machine used for the operation of at least the fuel cell.

5. The vehicle of claim 3, wherein the fuel cell system operation modes include a high potential avoiding control mode associated with a rotation number threshold value Na that is less than $N_{CONST}$.

6. The vehicle of claim 3, wherein the fuel cell system operation modes include a warm-up operation mode associated with a rotation number threshold value Nb that is less than $N_{CONST}$.

* * * * *